April 21, 1970          F. BODROSSY          3,507,567
METHOD OF MAKING CINEMATOGRAPHIC FILMS
Filed July 25, 1967          3 Sheets-Sheet 1
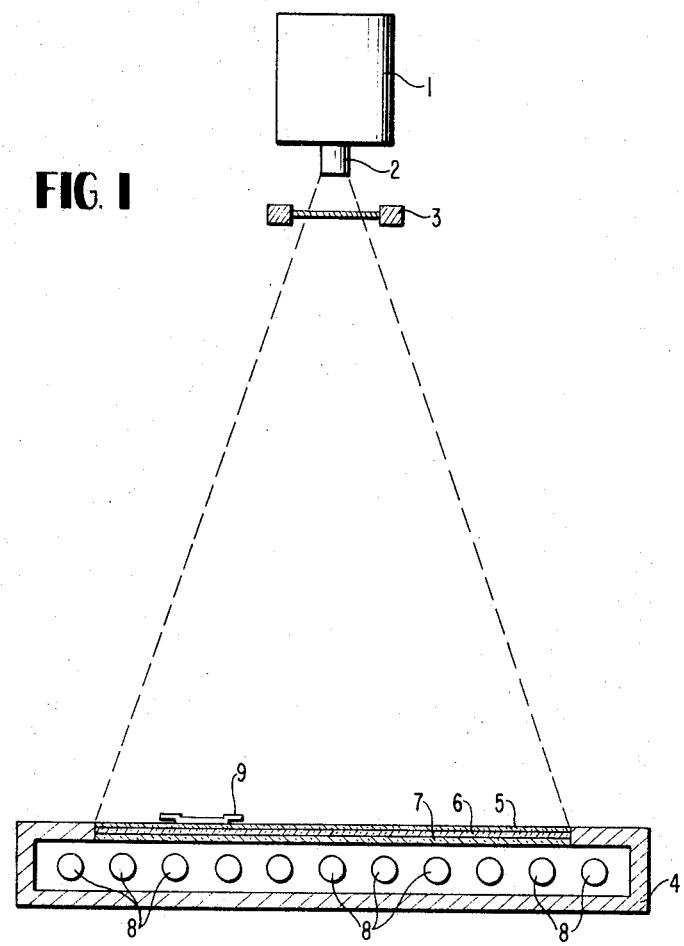
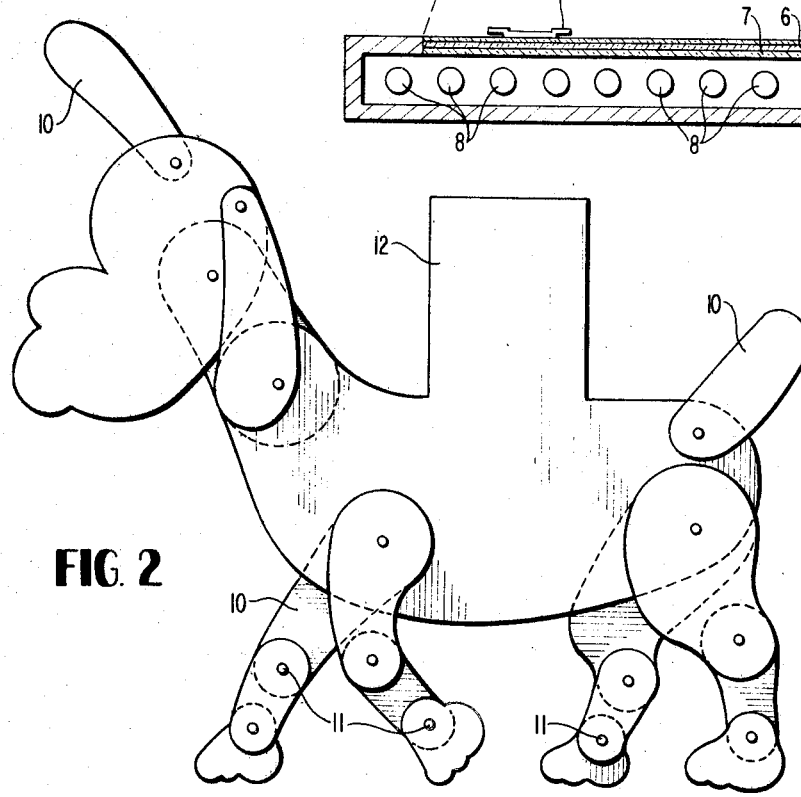
INVENTOR
FELIX BODROSSY
By Young & Thompson
ATTYS.

April 21, 1970   F. BODROSSY   3,507,567
METHOD OF MAKING CINEMATOGRAPHIC FILMS
Filed July 25, 1967   3 Sheets-Sheet 2

INVENTOR
FELIX BODROSSY
By Young + Thompson
ATTORNEYS

April 21, 1970 F. BODROSSY 3,507,567
METHOD OF MAKING CINEMATOGRAPHIC FILMS
Filed July 25, 1967 3 Sheets-Sheet 3

INVENTOR
FELIX BODROSSY
By Young & Thompson
Attys

3,507,567
METHOD OF MAKING CINEMATOGRAPHIC FILMS

Felix Bodrossy, Budapest, Hungary, assignor to Licencia Talalmanyokat Erlekesito Vallalat, Budapest, Hungary
Filed July 25, 1967, Ser. No. 655,764
Claims priority, application Hungary, Aug. 5, 1966, BO-1,046
Int. Cl. G03b 33/00
U.S. Cl. 352—45                                    1 Claim

ABSTRACT OF THE DISCLOSURE

The present invention relates to a method of making cinematographic films resembling animated cartoons by disposing a flat figure and crossed polarising filters between a light source and a camera lens, parts of the figure comprising an optically-active material for causing said parts to be photographically recorded on the film in color.

---

The present invention relates to methods of making cinematographic films.

It is already known that the motions in animated cartoon films must be resolved into individual phases or steps. A motion lasting one second is composed of 24 such phases: the animated characters must consequently be drawn or produced, in the appropriate attitudes, in as many separate exposures. These drawings must further be transferred to, e.g. Celluloid plates, coloured, and photographed in front of a corresponding background. All this represents a costly process requiring the tedious labour of a number of people. Experts in this technique are well aware, that the representation of minor details (e.g. patterns on clothing, the transitions between light and shadow to accentuate the plasticity of representation of the body, etc.) must be dispensed with, since, owing to the uncertain accuracy of the manually-executed drawings or paintings, these details would cause unsteady flickering of the picture when projected on a screen.

The problem is considerably simpler in the case of puppet films. The individual character puppets only require to be made flexible, and the separate motion phases are then set by the animator and photographed frame by frame. In this technique, the colours, the final details, and the lights and shadows remain unchanged. This does not, however, represent a substitute for or improvement in the technique of reproducing animated cartoons, and is in fact quite a different form of the art.

Endeavours to synthesize or combine the two techniques have been proposed using outline figures with movable parts, which are then photographed in the same manner as the puppets. In films made in this manner, however, the jointing elements of the various limbs, etc., the joint bearings and hinge pins are clearly visible, and the effect is quite primitive, since the figures are photographed by reflected light.

If photographed by transmitted light, the visibility of the joints between the limbs can be eliminated, but in this case, shadow images are produced, which considerably restrict the use of this technique.

It is an object of the present invention to provide a method of making a cinematographic film which approximates to the aesthetic effect of the animated-cartoon type of film while eliminating both the costly process of providing numerous drawings and the aforementioned difficulties of movable, two-dimensional figures.

According to the present invention, a method of making cinematographic films comprises interposing movable, flat figures between the object lens of a photographic camera and a source of light and photographing said figures through crossed polarising filters, those parts of said figures which are intended to be reproduced on the film comprising at least one optically-active material, whereby said parts are photographically recorded.

In one method of carrying out the invention, the scene to be recorded comprises a polariser having a large surface area and illuminated from below. An analyser is set in front of the lens of the camera, by which the light passing through the polariser can be extinguished. If, however, the optically-active material, e.g. a cellophane film, is placed between the polariser and the analyser so that the polarisation plane is rotated, then the light can penetrate, and can be recorded on the film.

The figures comprise mechanical components—generally a body, movably-jointed limbs, the head, and any projections required for attachment—which are, in general, carriers for the optically-active material.

The optically-active material of the parts which are intended to be reproduced on the film may be any material which refracts light twice and which in consequence of its directionally-oriented, crystalline structure or parallel molecular chains is suitable for rotating the polarisation plane.

Depending on the result desired, various constructions may be used for the movable, flat figures employed in the method according to the invention:

Example 1

If only the outlines of the figure are to be visible in the film, the mechanical components may be made of an opaque material, e.g. sheet metal, cardboard, synthetic plastics sheets or the like. A figure prepared in this manner is covered, by adhesive or otherwise, with the optically-active material in such manner that the latter projects beyond the opaque material.

Example 2

If the figure is to be visible in its entirety, the mechanical components are made of a transparent, optically-inert material such as Celluloid sheet and hinged together on transparent pins. The figure is then coated with an optically-active film such as cellophane.

Example 3

If the figure is to appear as a mosaic of spots with black separating lines, either mechanical components of opaque material can be provided with appropriate cutouts, or transparent mechanical components with locally applied, optically-active material can be used.

Colouring, in the case of a colour film, can be reproduced by two different methods, or any combination thereof:

(1) Depending upon the thickness of an optically-active coating, or a number of successive optically-active coatings, the analyser may be arranged to transmit only preselected component colours of the spectrum.

(2) Coatings may be applied which rotate the polarisation plane through a full 90°, whereby the analyser is made to transmit white light to the film. After this, the coating or the transparent, mechanical component can be coloured as required with translucent colour. The uncoloured parts then show white, while the remaining part show black.

By suitable application of optical coatings or emulsions, it is possible to obtain either a surface having an unchanging colour and brightness, or one that in motion changes to its complementary colour with attractive transitions, or one which darkens gradually during motion and finally vanishes.

Cinematographic films made according to this invention may produce a visual effect closely resembling that of conventional animated cartoons, but also possess features beyond the scope of the conventional methods. These features comprise satisfactorily steady outlines and colours, any desired wealth of detail, and finely-treated shadows.

The figures do not require to be drawn thousands of times over, on Celluloid sheets or plates, and then coloured: one figure can, in the same manner as a puppet, by itself play through a complete film. Thus, in the method according to the invention, the multitude of designers, stage draughtsmen, tracers and colorists in replaced by a group of one or two figure artists.

The invention allows of aids to be accommodated within the framework of the picture without becoming visible. Thus, besides individual shots, whole sequences can be filmed at once.

In the accompanying drawings, in which several embodiments of the present invention are shown by way of example:

FIGURE 1 is a schematic elevational view of a cinematographic camera in use according to the invention for the production of animated cartoons;

FIGURE 2 is one embodiment of an articulated flat figure for use in the present invention;

Figure 3:
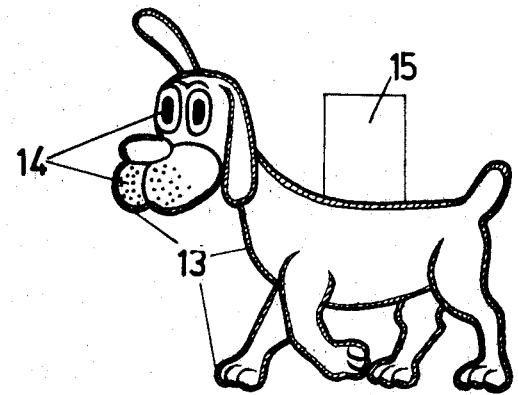
FIGURE 3 is a schematic representation of another type of figure wherein only the borders are provided with a thin anisotropic material to produce illuminated contours, the isotropic structural parts of the flat figures and the background remaining black.

Referring now to the drawings in greater detail, and first to FIG. 1, there is shown a conventional stop motion camera 1 mounted on a vertical axis and having a lens system 2 before which is disposed a polarizing adapter 3. A rotatable polarizer and a lamp housing 4 are provided in which light sources 8 are disposed. A linearly polarized panel 6 is uniformly illuminated through a diffusing glass 7. The movable flat figures and the decorations 9 are supported on a ground glass 5.

In FIG. 2, the flat figure is made of isotropic material, for example Celluloid or Plexiglas, which is invisible under cross-polarizing filters. The movable parts 10 of the body are connected to each other and to the trunk of the body by means of pins 11 of the same material. The projection 12 is useful to secure the figure in a desired position by means of a weight or an adhesive strip, which of course will be invisible on the film.

Figure 4:
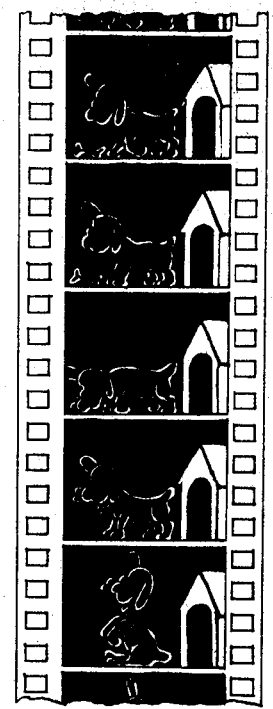
FIGURE 4 is a film sequence produced with the embodiment of FIG. 3.

An embodiment of a figure usable in connection with the present invention is shown in FIG. 3, in which the figure is provided with anisotropic material 13 only at its borders. The other portions 14 of the figure, within the contours, can be made by means of polarizing dyes or inks. The projection 15 and the other parts remain invisible on the film, while the contours and the specially marked portions appear in gleaming colors of the spectrum, as indicated in FIG. 4.

Figure 5:
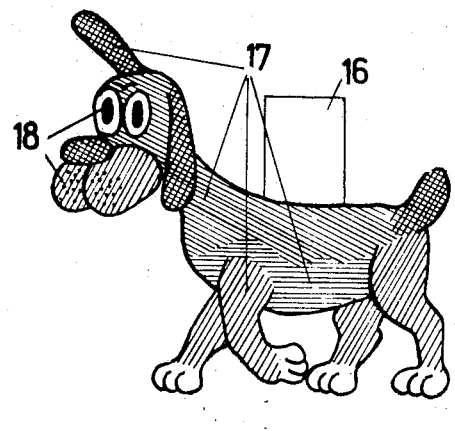
FIGURE 5 is a view similar to FIG. 3 but showing another embodiment in which substantially the entire surface is provided with thin anisotropic layers so that the whole figure becomes visible and its color depends on the number and thickness of the layers.
Figure 6:
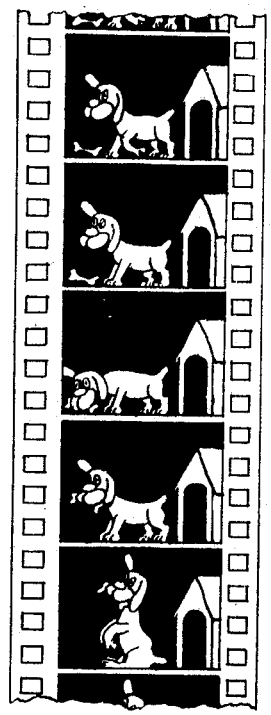
FIGURE 6 is a view similar to FIG. 4 but showing a film strip produced according to FIG. 5.

In FIG. 5 another embodiment is shown, in which the whole surface of the isotropic structure is provided with anisotropic layers 17 except the projection 16, and may be supplementarily painted at desired positions with transparent colors 18. As seen in FIG. 6, therefore, the whole figure is thus shown in illuminated color. These colors can be altered to their complements by rotating the polarizing adapter 3 to an angle of 90° while the dark ground becomes transparent.

I claim:
1. A method of making cinematographic films, comprising interposing movable, flat figures between the object lens of a photographic camera and a source of light and photographing said figures through crossed polarising filters, those parts of said figures which are intended to be reproduced on the film comprising at least one optically-active material, whereby said parts are photographically recorded.

References Cited
UNITED STATES PATENTS

| | | | |
|---|---|---|---|
| 2,522,662 | 9/1950 | Brier et al. | |
| 2,977,845 | 4/1961 | Boone | 352—87 |
| 3,177,765 | 4/1965 | Yates | 352—87 |
| 3,218,919 | 11/1965 | Sturner et al. | |

JULIA E. COINER, Primary Examiner

U.S. Cl. X.R.
352—87